United States Patent [19]

Sumner

[11] Patent Number: 4,538,722
[45] Date of Patent: Sep. 3, 1985

[54] CONVEYOR SHIFTING APPARATUS AND PROCESS

[75] Inventor: Maurice N. Sumner, Houston, Tex.

[73] Assignee: McNally Pittsburg, Inc., Pittsburg, Kans.

[21] Appl. No.: 480,510

[22] Filed: Mar. 30, 1983

[51] Int. Cl.³ .............................................. B65G 41/00
[52] U.S. Cl. .................. 198/861.2; 198/309; 104/7 R
[58] Field of Search ............... 198/309, 312, 315, 862, 198/864; 299/64, 43; 104/126, 7 R

[56] References Cited

U.S. PATENT DOCUMENTS

| | | | |
|---|---|---|---|
| 2,873,022 | 2/1959 | Murphy | 198/808 |
| 3,612,257 | 10/1971 | Goergen et al. | 198/864 |
| 4,139,087 | 2/1979 | Westhoff et al. | 198/309 |

FOREIGN PATENT DOCUMENTS

| | | | |
|---|---|---|---|
| 1001108 | 12/1976 | Canada | 198/864 |
| 0066312 | 12/1982 | European Pat. Off. | 7 R/ |
| 1179861 | 10/1964 | Fed. Rep. of Germany | 198/309 |
| 1581071 | 9/1969 | France | 104/7 R |
| 54478 | 12/1967 | Poland | 198/864 |
| 580161 | 11/1977 | U.S.S.R. | 198/309 |

*Primary Examiner*—Joseph E. Valenza
*Assistant Examiner*—Jonathan Holmes
*Attorney, Agent, or Firm*—John M. Harrison

[57] ABSTRACT

A shifting conveyor apparatus with a belt conveyor laterally shiftable, by flexibly mounted flexible rails therealong, towards a progressive excavation, including a travelling varingly-curving rail-engaging guide array for carrying and drawing the conveyor laterally by the rails, keeping the rails and the conveyor belt in safely controlled and guided distributed travelling curvature.

7 Claims, 33 Drawing Figures

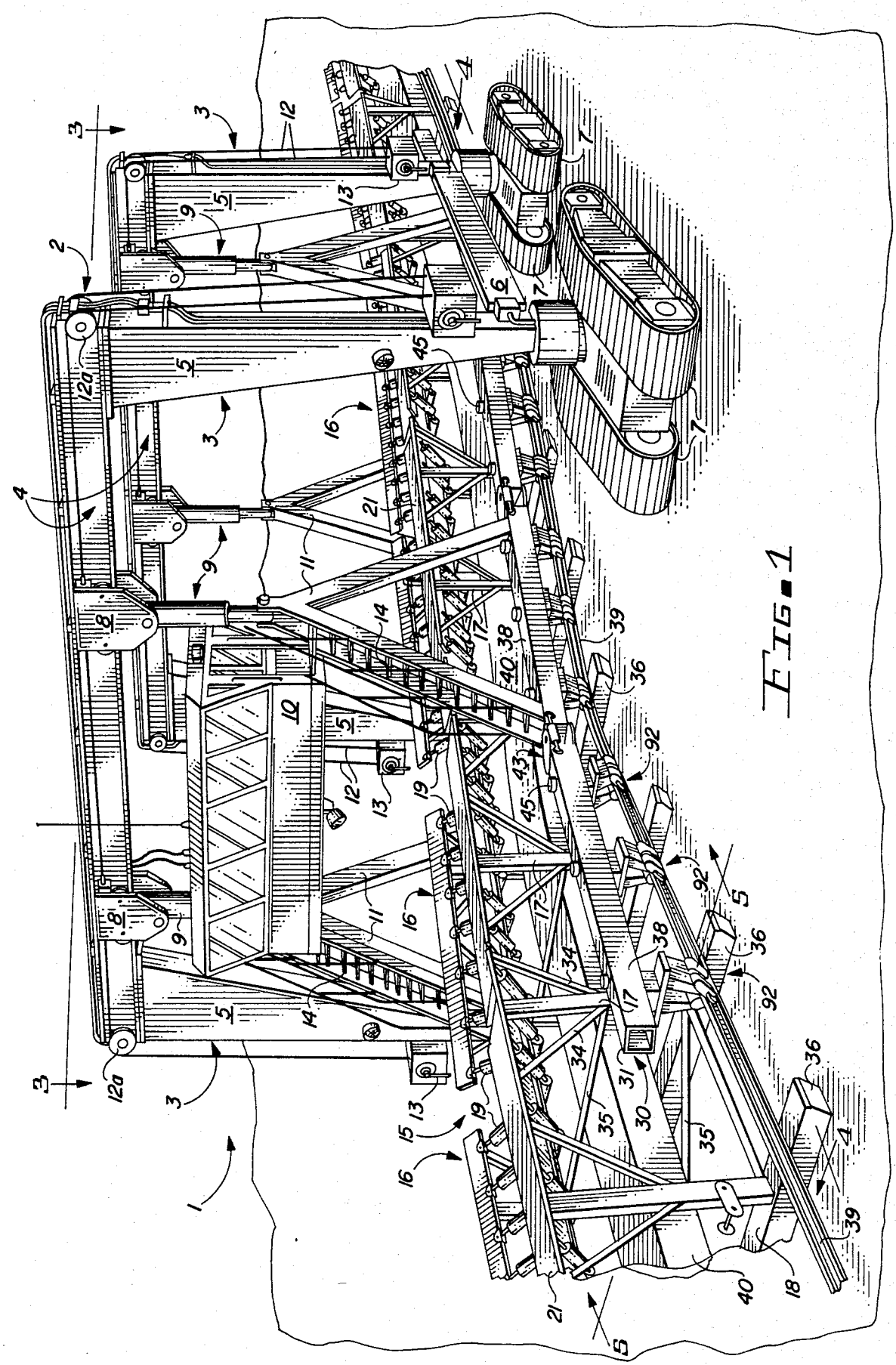

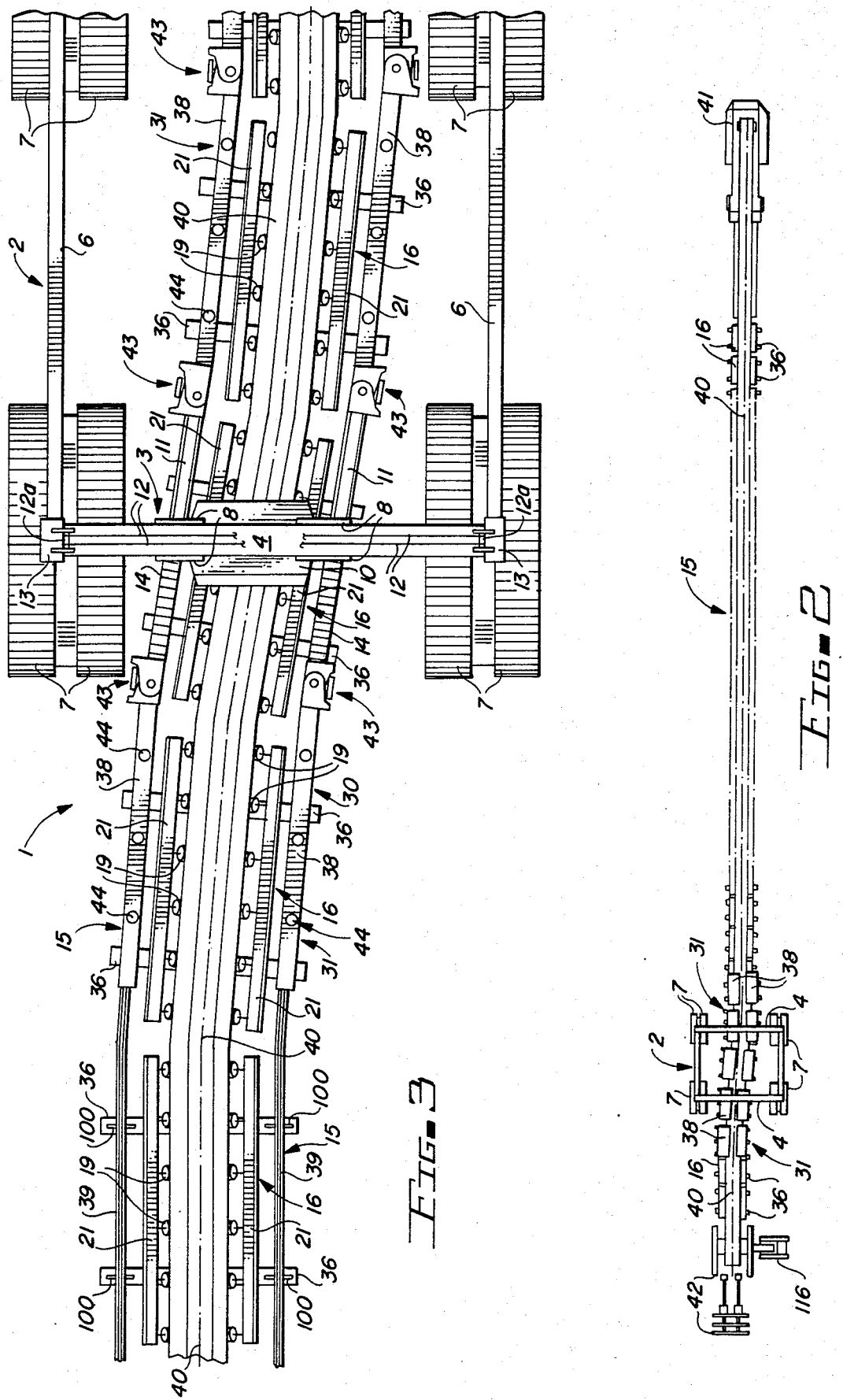

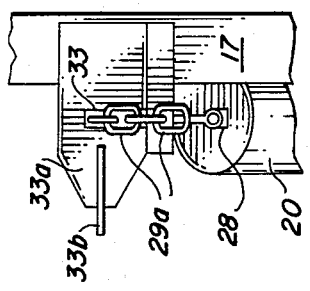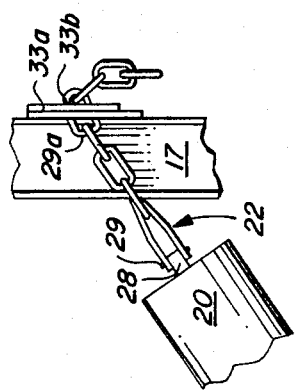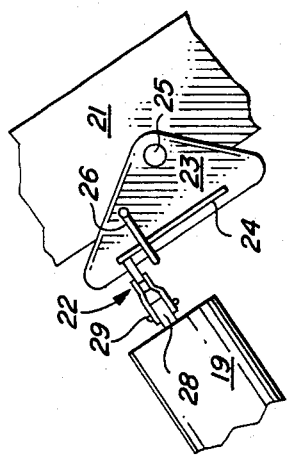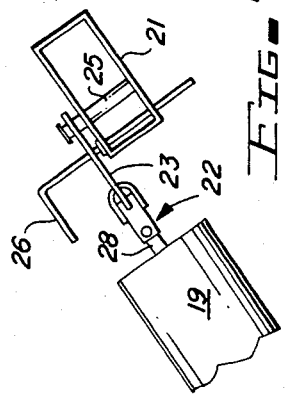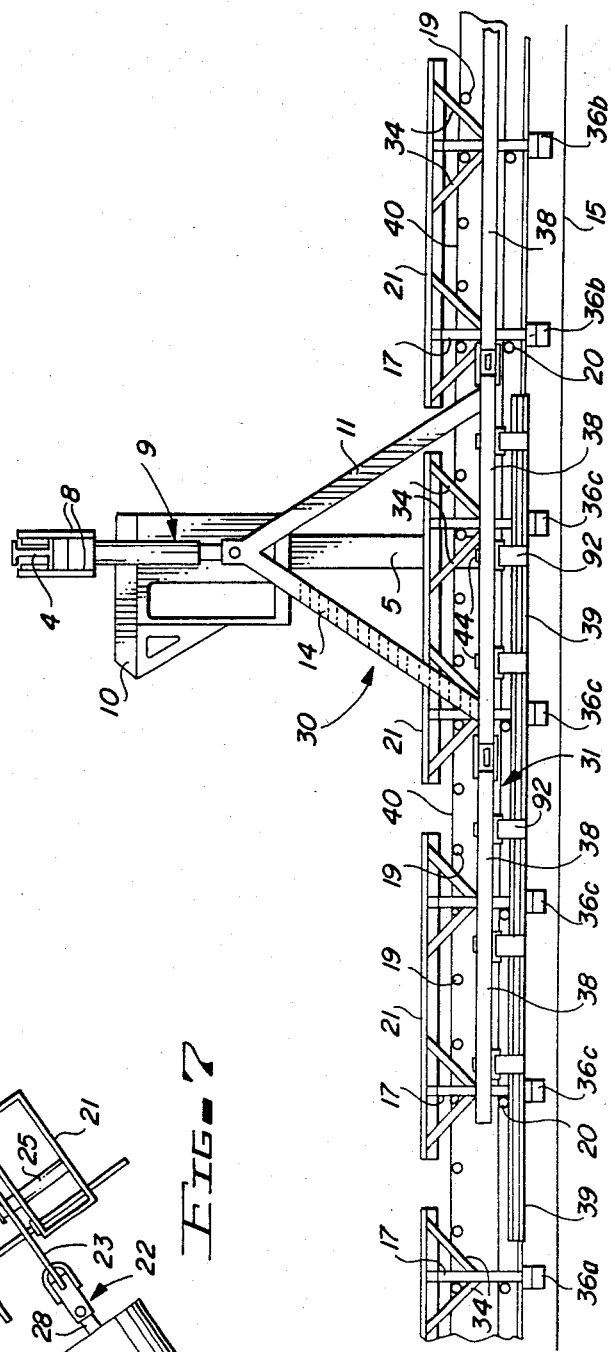

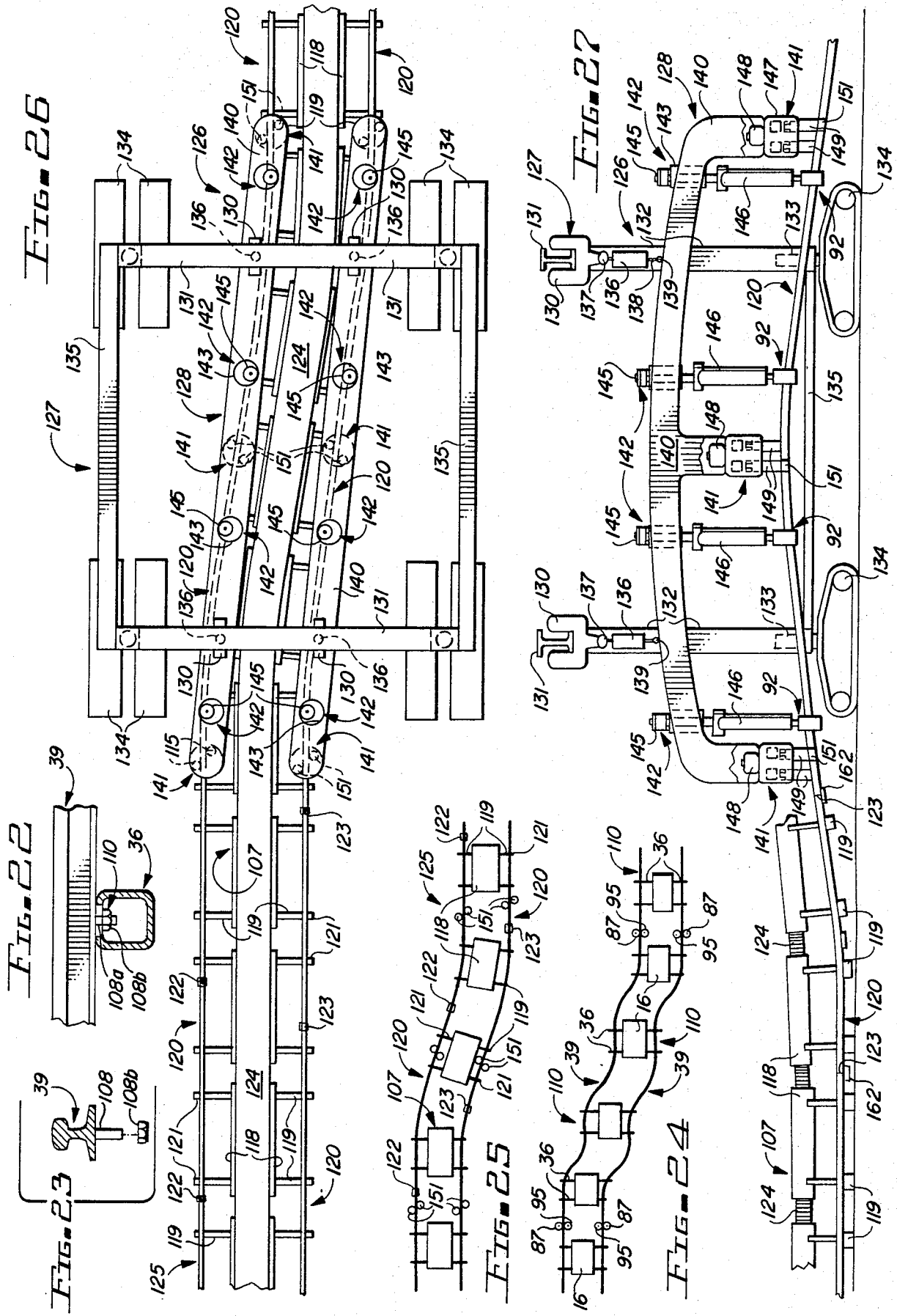

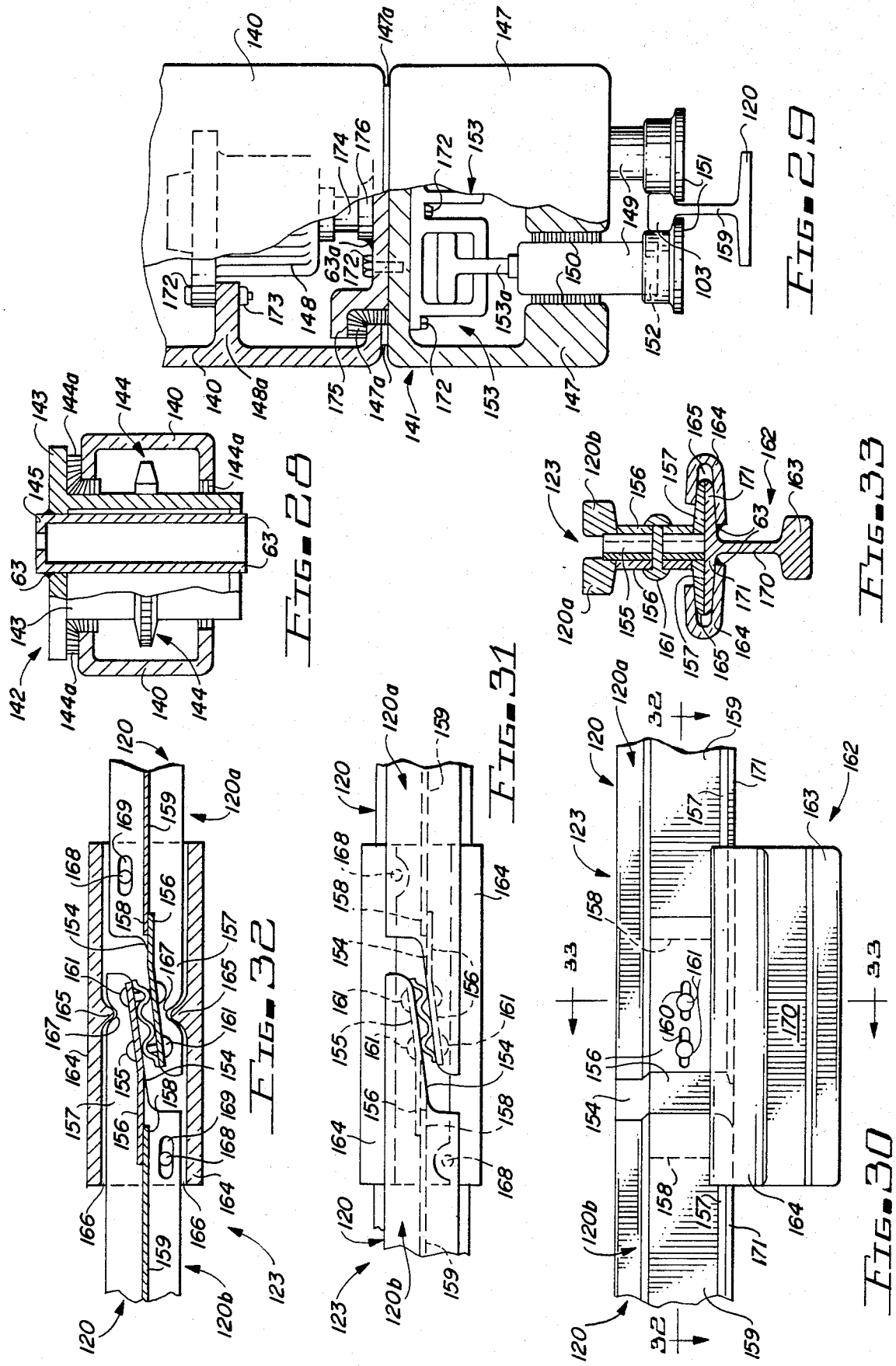

CONVEYOR SHIFTING APPARATUS AND PROCESS

BACKGROUND OF THE INVENTION

1. Field of the Invention

This invention relates to long bulk conveyors and to the cooperative combination of flexibly shiftable belt conveyors and travelling shifting apparatus for lateral shifting of such conveyors by guided distributed travelling curvature, the shifting being to maintain convenient proximity to a progressive excavation of a bulk deposit such as lignite for convenient removal of the excavated bulk by the conveyor. More particularly, this invention relates to a belt conveyor comprising a framework comprising a flexible continuous rail or rails, a sequence of relatively rigid roller-carrier frames, and a set of pivotal, slidable, or rigid connections, the rails and frames being assembled by the connections into a flexibly continuous shiftable and accessible whole, the flexible continuity being largely due to the flexibility of the rails with the connections, and not largely due to the roller-carrier frames. This invention further relates to a travelling hoisting, shifting, and guiding vehicle with an adjustably curving rail-engaging guide roller array wherein the vehicle continuously powers and urges the guide array along the rails, and meanwhile powers, urges, holds, and adjusts the guide array in lateral and vertical position and in attitude, orientation, and curvature so as to shift the conveyor through a good distance by keeping the rails in controlled distributed travelling curvature. This invention also relates to an elongate guide carrier beam assembly for carrying a plurality of rail-engaging roller assemblies into linear and varyingly curvilinear engagement with the conveyor rail or rails, all for carrying and drawing the conveyor laterally by the rails while keeping the rails in safely controlled and guided distributed travelling curvature.

2. Description of the Prior Art

At a very early date in the development of open cast mining of lignite desposits it became apparent that sophisticated and heavy equipment would be necessary to remove the lignite in small chunks and pieces and transport it from the point of mining to a pick-up or storage location in economically feasible quantities. Since the mining apparatus which was developed to meet this goal is complex, bulky and heavy, and is designed to successively remove the lignite deposits farther and farther from the pick-up or storage location, it became necessary to develop successively longer conveyors for transporting the lignite to a point of loading or storage. These conveyor systems were designed in sections to facilitate periodic adjustment of the conveyor line to new positions closer to the lignite deposits. As the piecemeal-shiftable conveyor systems became more complex and greater in length, it became increasingly difficult to move the continuous conveyor sections from one location to another site which is closer to the point of mining of the lignite. Accordingly, special track lifting mechanisms were introduced into open cast lignite sites, and the weight of such apparatus has ranged up to 100 tons, and frequently had to be pulled by locomotives. This equipment was sometimes provided with traversing crawlers for quicker cross-travel between the conveyor lines which had to be shifted, and the cost of the conveyor-shifting operation became increasingly prohibitive as the conveyor lengths increased.

Perhaps the most widely used steerable, non-railbound, shifting device is a machine developed in 1953 by Rheinische Braunkohlen A.G., a German Company which introduced several innovations into the conveyor shifting procedure. A high shifting rate was achieved using the new apparatus, and the machine provided good maneuverability on rough and uneven terrain. Other advantages consisting of low maintenance and space requirements and independence of rail mounting, as well as reduced costs, were also realized. The steerable, non-railbound track shifting machine is small and compact, but requires the use of a bulldozer or tractor to provide the motive force required in the shifting technique. The German shifting apparatus includes a roller unit which is characterized by a welded casing fitted with two sets of rollers, one roller in each pair being fixed and the other pivotable on side arms, the pivotable roller designed to bias against the shiftable conveyor railbulb of one of the rails by an adjusting mechanism. Buffer springs in the apparatus serve to compensate for unequal rail head dimensions, and the device is provided with arms for connection to the tractor or bulldozer. The tractor must be provided with a side boom, which is attached to the top of the shifting apparatus after the apparatus is connected to one of the rails of the shiftable conveyor. The side arms extending from the roller unit are supported against one side of the tractor. The roller unit is designed to traverse one rail of the shiftable conveyor as the tractor is driven forward and at an angle with respect to the shiftable conveyor line. When the roller unit of the shifting apparatus is mounted on one of the rails of the shiftable conveyor, the roller with the rail attached is then raised by the boom mounted on the tractor, until one end of the track sleepers is clear of the ground. The tractor is then moved forward along the conveyor, pulling the conveyor sections in the shiftable conveyor into sequential alignment from a first linear position to a second linear position closer to the lignite deposits. If sliding of the tractor occurs, during the shifting or realignment process the tractor must be steered at a slight angle away from the conveyor string in order to provide the proper tractive force and direction to realign the conveyor sections. The distance over which the rail is drawn sideways in one passage is sometimes called a "shifting step", and is represented to be up to two meters on dry and level ground. However, in the first passage, the designers of the German shifting apparatus recommend that the rail and sleepers be loosened from the original linear position, particularly in the case of frozen ground, and the second pass is then utilized to actually displace the conveyor sections from one position to the other. The designers further emphasize that the successive shifting steps ought to be small, rather than large, in order to minimize damage to the rail and the tractor and to achieve a fair tractor travel speed. Counterweights must also be used on the tractor, especially when the ground is soft, in order to better regulate traction.

In the steerable, non-railbound, German shifting machine, great stress is placed on the shiftable conveyor rail resulting from the shifting, lifting and forward motion of the tractor, to great disadvantage. For shiftable conveyor rails with wider rail gauges, the stress and load increases considerably, particularly if the module sleepers must be pulled from a clay or loam base, which sometimes create a suction effect. Such high loads and stresses frequently cause damage to the conveyor rail, and in many cases require replacement of the rail due to severe rail distortion, which prevents subsequent traversal of the rail by the roller unit of the shifting apparatus. Furthermore, the shifting procedure using this equipment is slow and requires multiple passes in order to be effective, particular under circumstances where the lateral displacement of the shiftable conveyor must be extensive.

Many disadvantages are found in the side-boom tractor with two roller pairs as found in the prior art. Firstly, the lateral force on the rail must be of the same order of magnitude as the vertical force, or even exceed it, since the coefficient of sliding friction between the sleepers and the ground will certainly sometimes exceed 1, and the shifting is obtained by dragging one end of the nearby sleepers or cross-ties across the ground, and both ends of some nearby ones. This by itself is very hard on the rails and connections, but this drag has the additional penalties next discussed. Secondly, the offset resulting from any s-shaped or reflex curve in a structural member depends largely on two causes, namely the curvature, and the length over which the curvature is obtained. As is well known in structural mechanics, bending stress is directly proportional to curvature (i.e., inversely proportional to radius of curvature), and since stress is limited by consideration of the material to some allowable stress, then curvature is likewise limited to some peak allowable. It is therefore desirable to have the peak value obtain over a length. But in the prior art, the curvature will be maximum nowhere but within the roller assembly, and the drag forces aforementioned will diminish the length of curvature obtained, thereby diminishing the shifting step. Thirdly, there being only two roller points, and, two points being insufficient to define a curve, the curvature is not defined nor limited by the design of the machine, but rather by the actions of the operator as governed by information, judgement, and attention, which may vary, unfortunately. Fourthly, since the drag forces are suddenly and unpredictably variable, with only the two roller pairs lifting only one side of the conveyor while dragging the other and while breaking adhesion of the ties to the ground, the maximum offset safely obtainable is likewise unpredictable. There might be some safe limit, but since the limit would only occasionally apply, the temptation would build to take too long a step, and then to cause damage. Fifthly, the lifting of one side of the conveyor while dragging the conveyor introduces torsional stresses into the rails; such stresses are simultaneous with the stresses due to lateral curvature, and must be reckoned into the total and thus reduce the allowable lateral curvature. These stresses also tend to break the connections between the rails and the roller-carrier frames. Sixthly, the lifting effects are maximum at precisely the point where the lateral bending and torsional effects are maximum, and therefore further limit the lateral curvature allowable.

These and other disadvantages of the side-boom apparatus of the prior art find expression in frequent breaking of the rails and connections, and in long periods of down-time during conveyor shifts. More detailed discussion and structural analysis of such shifting structures will further illuminate the prior art, and serve to illuminate this invention as well, and such discussion follows.

In the lateral shifting of flexibly shiftable conveyors, it is necessary to bring a travelling interval of the conveyor into a travelling s-shaped or reflex curve, or into some approximation of such a curve. Analysis and understanding of such structures and their deflection curves is usually best accomplished by a progression of idealizations from a first simplest idealization to other more complicated and accurate approximations such as follow.

For a first illumination and a first approximation, consider some conveyor framework as if it were an initially straight beam brought into horizontal bending; such idealizations are sometimes usefully applied to triangulated trusses using the moment of inertia of the chords alone in beam-theory to approximate stresses, then using the rule-of-thumb that calculation will underestimate deflections by 15%, more or less. Such calculation will show that no useful flexible shifting can be obtained in fully triangulated structures of such proportions as are found in strip mining, since even a hundred tons of lateral force on the rails would defect such structures only a few inches, even with a hundred feet of curvature. Such forces and lengths would destroy the conveyor, rather than bring it into useful curvature. This is, of course, one of the reasons that such structures are not fully triangulated, but rather comprise triangulated panels and rectangular panels in alternating sequence. Nevertheless, useful insight can be obtained from the idealization, as follows. The idealization shows that deflection will depend on the magnitude of the curvature everywhere, not just at one point, and that the greatest offset is obtained in a given length by having the absolute value of the curvature be maximum everywhere. To have curvature be maximum everywhere is to have a pair of equal opposite tangent circular arcs, the radius of curvature for maximum safe offset being determined by the depth of the beam (i.e., the width of the conveyor) and the material of the beam, and only by those things. In the art, the material is rail steel, and the tolerable radius of curvature will be a thousand or so times the beam depth. Now, in the prior art here considered, the reflex curve is obtained by application of a shear at the end of the curve, so the curvature resulting varies linearly rather than remaining constant, i.e., the moment diagram is a pair of antisymmetrically disposed triangles, resembling a skewed bow tie. Engineer's beam theory will show the resultant deflection to be two-thirds of that obtained by the stepped rectangular diagram of constant (i.e. circular) positive and negative curvature; therefore the prior art method stresses the structure to a maximum while obtaining only about two-thirds of the maximum ideal or theoretical offset. The conclusion is tentative, pending a more refined model. The ideal for the beam-like truss is obtained by the application of three moments, a first one at the center of the reflex curve, and two others of opposite sense, each half the magniture of the first, at the two ends. Such a system is in equilibrium, and requires no imposition of shears whatever. No lateral force need be applied.

As a second and closer approximation to the shiftable conveyors of the prior art, it is useful to analyze the conveyor frame as approximately a Vierendeel frame in the horizontal plane, i.e. as a bending member having rails as the two chords and having the sequence of roller-carrier frames as the sequence of posts of the well-known Vierendeel frame, and having the four rail-to-frame connectors at the four corners of each frame as the moment connectors between posts and chords which characterize the Vierendeel frame. In such frames, overall shear is resisted by s-shaped or reflex bending of the chords between the posts, and such reflex bending is by far the largest contributor to the overall deflection in case the posts and moment connectors are stiff, and such is the case in the conveyors of the prior art. Seen otherwise, the principal deflections here are panel deflections or shear deflections; deflections due to overall flexure are a very small part of the whole. Therefore the maximum safe deflection in such conveyors is not found when the overall curvature approximates the s-shaped curve composed of two semicircles, but is obtained by having constant maximum panel shear, the overall curve approaching the cross-section of a terraced lawn of constant step height and constant step width, with the individual step-connecting slopes corresponding to the s-shaped curve of the first approximation. The overall average curvature during maximum safe deflection would approximate a ramp more than it would approach the two semicircles of the first approximation.

Even if a complete degree of rotary freedom were introduced into each of the four rail-to-frame connections at every roller-carrier frame (i.e., by making the connections pinned, rather than fixed as in the prior art), the action of the whole would still correspond to a Vierendeel frame with significant flexibility in the posts, since the points of entry of the rails into the post region would be slanted rather than level. The rails would be in curvature everywhere, with inflection points not only at the midpoints of the open shear panels, but also at the midpoints of the triangulated roller-carrier frames. The curve of the rails would then resemble a tilted corrugation, more than a sequence of terraces. The average overall curvature for maximum safe deflection would still approximate a ramp (albeit a corrugated ramp) more than it would approximate the two semicircles of the first overall approximation. However, the safe allowable deflection would be approximately doubled, as can be seen from strain-energy considerations, thus: Suppose, for simple example, that the open panels and triangulated panels were equal in width. Then the portion of the rails within the two types of panels would be equal in length and curvature, and would be twice that of the rails of the prior art, thus the strain energy will be twice as great, the maximum allowable rail curvature would have remained unchanged and, the shear unchanged. Therefore, the lateral load would be the same at lateral safe deflection, the external work must equal the strain energy and the lateral load must deflect twice as far.

OBJECTS OF THE INVENTION

Accordingly, it is an object of this invention to provide a new and improved shiftable belt conveyor wherein the rails are attached to the roller-carrier frames with a degree of freedom, thereby allowing an improved and greater safe shifting step.

Another object of this invention is to provide a new and improved shiftable belt conveyor wherein the rails are attached to the roller-carrier frames with a rotary degree of freedom, thereby allowing an improved and approximately doubled safe-shifting step.

Another object of this invention is to provide a new and improved shiftable belt conveyor wherein the rails have a sliding degree of freedom, thereby allowing the overall curvature of the conveyor to be arcuate, thereby providing a maximum shifting step.

Another object of this invention is to provide relief from stress concentration in conveyor rails by providing a degree of freedom in the connection of the rails to the roller-carrier frames.

Another object of this invention is to provide travelling spaced lifting and shifting machinery for conveyor lifting and shifting, so that stresses due to the one are not added to stresses to the other.

Another object of this invention is to provide travelling conveyor hoisting machinery for hoisting conveyors in translation without torsion, thereby avoiding stresses due to torsion of the conveyor rails and frame.

Another object of this invention is to provide conveyor hoisting and shifting machinery with means to hoist, shift, and lower a conveyor in separate travelling progression, thereby distributing and reducing various peak stresses, and thereby assuring that every point on the rails is subject to a stress always less than the sum of the peak values due to various effects such as the following:

(1) vertical bending in breaking adhesion with the ground, (2) vertical bending in curvature of the ground, (3) vertical bending in lifting the conveyor off of the ground, (4) lateral bending due to dragging the conveyor across the ground, (5) lateral bending due to shifting curvature, (6) longitudinal stresses due to warping and torsion of the whole conveyor, (7) longitudinal stresses due to local torsion of the rail due to high lateral forces at the bulb of the rail, and (8) connection stresses due to oveturning of the rail due to high lateral forces at the bulb of the rail;

(9) connection stresses due to overturning of the rail due to high lateral forces at the bulb of the rail, the assurance coming from the distribution of the peaks.

Yet another object of this invention is to provide an adjustable rail-engaging roller array sufficient to define safe vertical and lateral curvature of the rails during hoisting and shifting of a flexibly shiftable belt conveyor.

Another object of this invention is to provide a long rail-engaging curvature-defining array providing a long shifting step by defining a long interval of substantially constant maximum curvature or slope.

Another object of this invention is to provide an elongate beam means providing a long shifting step by providing a substantial length of support of the rail free of a substantial length of ground, thus enabling a long support rail-engaging curvature and/or slope.

Another object of this invention is to provide a controlled-curvature rail-engaging array with a laterally straight rail entry to insure against lateral bending stresses other than those resulting from controlled curvature and slope.

Another object of this invention is to provide a conveyor-shifting vehicle having an elongate articulate beam string for variably defining curvature in a rail-engaging array, with steering and beam-adjusting means to support the array in such orientation, attitude, and position as to cause straight rail entry into and exit from said array over varying terrain while variably defining curvature and slope.

Another object of this invention is to provide releasable couple between a conveyor-shifting vehicle and a conveyor shifting rail-engaging array to allow for alternative uses of the vehicle, and housing, maintenance, and spares for the array.

Yet another object of this invention is to provide, in shifting conveyors, a set of three rail-engaging roller arrays for imparting three moments to a rail for reflex curvature, the three comprising a central moment of a first sense and magnitude, and two equal other moments of the second sense and half of the first magnitude, for defining two adjacent intervals of equal and opposite constant circular curvature in rails.

Yet another object of this invention is to provide, in shifting conveyors, a first lifting rail-engaging roller array having lateral freedom, and a second laterally-urging rail engaging array having vertical freedom, for independent definition of vertical curvature and horizontal curvature of the rails.

And another object of this invention is to provide, in shifting conveyors, a beam carrying an adjustable rail-engaging roller array which will adjust to provide maximum safe deflections either for conveyors with maximum safe deflection curves approximating constant curvature or for those with maximum safe curvature approximating constant slope.

Accordingly, furthermore, it is an object of this invention to provide a new and improved conveyor shifting apparatus for moving a shiftable conveyor from a first linear position to a second position, which apparatus includes a pair of shifting beam strings spanning the conveyor and slidably cooperating with both rails in the conveyor to progressively shift the conveyor sections into the second position.

Another object of this invention is to provide a new and improved conveyor shifting apparatus of the steerable non-railbound and shifting design, which includes a pair of shifting beam strings defined by an articulated shifting beam or beams provided with rail engaging assemblies containing roller mechanisms for engaging the rails of a shiftable conveyor and displacing the conveyor sections in the shiftable conveyor from a first linear position to a second linear position displaced a selected distance from the first linear position.

Another object of the invention is to provide a new and improved conveyor shifting apparatus which includes a pair of shifting beam strings formed by multiple shifting beams in end-to-end articulated relationship, and positioned on either side of a set of shiftable conveyor sections and in engagement with the rails of the shiftable conveyor sections by means of at least one roller mechanism in each shifting beam, with respectively opposed ones of the shifting beams in the shifting beam strings maintained in substantially parallel relationship as the shifting beam strings articulate responsive to the movement of a supporting straddle crane or lifting device along the shiftable conveyor, to displace the shiftable conveyor sections a selected distance from a first linear position to a second linear position.

Yet another object of the invention is to provide a conveyor shifting apparatus which is used in cooperation with a straddle crane or alternative lifting and forward-moving device having a supporting gantry frame and tracks or wheels in cooperation with the gantry frame to effect forward movement, the conveyor shifting apparatus including a first group of shifting beams fastened end-to-end in linear, articulated relationship and supported on each side of the shiftable conveyor by lift frames attached to the straddle crane, and multiple roller mechanisms extending downwardly from each of the shifting beams and in engagement with the rails of the shiftable conveyor sections, for traversing the rails and successively urging the shiftable conveyor sections and the shiftable conveyor from a first linear position to a second linear position displaced from the first position, responsive to the forward motion of the straddle crane and the lateral pressure applied to the conveyor sections by means of the shifting beams and the roller mechanisms.

A still further object of this invention is to provide a new and improved conveyor shifting apparatus which is supported and operated by a novel straddle crane and includes a pair of shifting beam strings which contain multiple shifting beams positioned in end-to-end relationship and fitted with articulated joints, the shifting beam strings spaced in substantially parallel relationship on each side of several of the shiftable conveyor sections and attached to the rails of the shiftable conveyor sections by means of roller mechanisms which engage and traverse the rails joining the conveyor sections responsive to forward movement of the supporting straddle crane, to successively urge the rails and the shiftable conveyor sections from a first linear position displaced a selected distance from the first position, in order to move the shiftable conveyor closer to the point of mining.

SUMMARY OF THE INVENTION

These and other objects of the invention are provided in a laterally travelling conveyor system comprising a flexibly shiftable conveyor having a sequence of roller-carrier frames and a pair of rails tied together with connections having a degree of freedom, and further comprising a steerable hoisting and guiding vehicle carrying an elongated beam carrying an adjustable rail-engaging guide array for carrying the conveyor laterally by the rails in safely controlled and guided distributed curvature.

BRIEF DESCRIPTION OF THE DRAWINGS

The invention will be better understood by reference to the accompanying drawings, wherein:

FIG. 1 is a perspective view of a preferred embodiment of the conveyor shifting apparatus, which illustrates a novel straddle crane supporting a shifting framework of beam strings and roller array in functional position with respect to a novel shiftable conveyor;

FIG. 2 is a diagram of the straddle crane in travelling position over a shiftable conveyor, more particularly illustrating the lateral displacement of the conveyor by travelling curvature responsive to the movement of the straddle crane;

FIG. 3 is a plan view of the apparatus in FIG. 1 with parts omitted for clarity, taken along lines 3—3 in FIG. 1, more particularly illustrating the shifting beam strings in the conveyor shifting apparatus and the displacement of the shiftable conveyor in travelling curvature, responsive to the forward motion of the straddle crane;

FIG. 4 is a side elevation, partially in section taken along lines 4—4 in FIG. 1, more particularly illustrating one side of the conveyor shifting beam string and array in functional engagement with the shiftable conveyor and suspended from the straddle crane;

FIG. 6 is a sectional side view of a typical mounting of a shiftable conveyor belt-carrying idler attached to an idler stringer in the conveyor sections;

FIG. 7 is a sectional view of the carrying idler and the idler stringer of the shiftable conveyor illustrated in FIG. 6;

FIG. 8 is a sectional view of a typical mounting of the conveyor belt return idler to the stringer supports in the conveyor sections;

FIG. 9 is an end elevation of the conveyor belt return idler mount illustrated in FIG. 8;

FIGS. 22 and 23 are orthogonal elevation section details illustrating a preferred articulated rail-to-sleeper connection of the invention;

FIG. 24 is a schematic plan of the optimum travelling curvature of a first embodiment of the invention;

FIG. 25 is a schematic plan of a substantial length of a second preferred embodiment of the conveyor of the invention, illustrating optimum travelling curvature thereof;

FIG. 26 is a more detailed plan of a substantial length of the conveyor of the invention, also illustrating the second major embodiment of the shifter of the invention;

FIG. 27 is an elevation section of the apparatus of FIG. 26, taken on line 129—129 in FIG. 26;

FIG. 28 is a section showing a rotating lifting and shifting means of the invention;

FIG. 29 is a partial elevation, partial section of a torquing means of the invention;

FIG. 30 is an elevation of a telescoping rail joint of the invention;

FIG. 31 is a plan view of the rail joint illustrated in FIG. 30;

FIG. 32 is a central plan section of the rail joint illustrated in FIG. 30, taken on line 168—168 in FIG. 30; and FIG. 33 is a central cross-section of the joint illustrated in FIG. 30, taken on line 169—169 in FIG. 30.

DESCRIPTION OF THE PREFERRED EMBODIMENT

Figure 5:
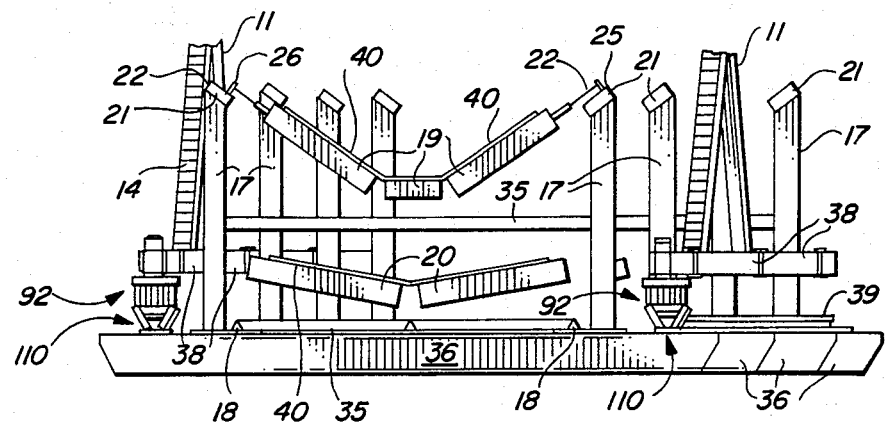
FIG. 5 is a sectional view taken along lines 5—5 in FIG. 1, more particularly illustrating the functional position of the conveyor shifting apparatus engaging the shiftable conveyor.

Referring now to FIG. 1 of the drawings, the conveyor shifting apparatus of this invention is generally illustrated by reference numeral 1, and is illustrated in functional configuration on a shiftable conveyor 15 of the invention. The straddle crane 2 of the invention serves to provide the linear and lateral motive forces necessary to achieve lateral shifting of the conveyor sections 16 in the shiftable conveyor 15, and operates by means of drive tracks 7, mounted on columns 5 in gantry frames 3, which are spaced by spacer beams 6 and are positioned astride the shiftable conveyor 15 by means of trolley beams 4. Trolleys 8 are relatively movable on the trolley beams 4 by means of trolley cables 12 and the cooperating cable rollers 12a, responsive to the trolley winch drive 13. Operation of the winch drive 13 serves to position the trolley hydraulic rams 9, attached to the trolleys 8, and the sawhorse-shaped lift frames 11, positioned on the piston end of the trolley hydraulic rams 9, in proper vertical orientation on the trolley beams 4. A cab 10 is positioned between the forward ones of the trolley hydraulic rams 9 and the lift frames 11 to provide a control module from which the drive tracks 7 can be steered to facilitate proper re-alignment of the shiftable conveyor 15, as hereinafter described. Steps 14, located in the forward one of lift frames 11, serve to provide access to the cab 10.

The conveyor shifting apparatus 1 includes a rail-engaging array 30 comprising shifting beam strings 31, which in this preferred embodiment are generally square or rectangular in cross section, and are articulated in end-to-end relationship. The shifting beam strings 31 are suspended from the lift frames 11 by removable or permanent attachment between the bottom ends of the lift frames 11 and two of the shifting beams 38 in each of the shifting beam strings 31, respectively, as illustrated. In this preferred embodiment of the invention five such shifting beams 38 are utilized in each of the shifting beam strings 31, and the second one of shifting beams 38 in each of the shifting beam strings 31 from each end are connected to the lift frames 11. As further illustrated in FIG. 1, the shifting beam strings 31 are disposed in approximately parallel, spaced relationship on each side of the shiftable conveyor 15, and the shifting beams 38 are joined to each other in pivotal adjustable articulating relationship by means of a pair of powered shifting hinges 43. Multiple rail-engaging suspender assemblies 92 are suspended in spaced array from the shifting beams 38, and engage the rails 39 of the shiftable conveyor 15, to facilitate traversal of the rails 39 and progressive lifting and guiding of the respective conveyor sections 16 in travelling curvature responsive to the forward progress of the straddle crane 2 along the shiftable conveyor 15, defining a curvature as hereinafter described.

Referring now to FIGS. 1-4, and to FIG. 2 in particular, a flexibly shiftable conveyor 15 is illustrated, with head station 41 at one end, a tail station 42 at the opposite end, and the apparatus 1 comprising a straddle crane 2 astride the shiftable conveyor 15. As further illustrated in FIG. 3, the rail engaging array 30 is in functional position carried by the straddle crane 2, and as the straddle crane 2 moves in the direction indicated by the arrow along the shiftable conveyor 15, the conveyor sections 16 located between the straddle crane 2 and the tail section 42 are successively being pulled into alignment with that previously adjusted portion of the shiftable conveyor 15 which is located between the straddle crane 2 and the head station 41. The mechanics of this adjustment of the shifting conveyor 15 from a first linear position illustrated by that portion of the shiftable conveyor 15 which is located between the straddle crane 2 and the tail station 42, to a position in linear alignment illustrated by the segment located between straddle crane 2 and head station 41, will be hereinafter described more in detail. As further illustrated in FIG. 3, the shifting beam strings 31 permit the articulated shifting beams 38 to assume the configuration of those conveyor sections 16 in shiftable conveyor 15 which are positioned between the shifting beam strings 31 and are in the process of being shifted from the first linear configuration to the second linear position. Referring now to FIG. 4, the rail-engaging array 30 is shown in elevation view, the straddle crane 2 illustrated in elevation section, and the varying clearance of the module sleepers 36a, 36b, and 36c above the ground, upon which the shiftable conveyor 15 rests when operating, is illustrated, which clearance facilitiates the shifting operation illustrated in FIGS. 1-3. It will be appreciated that the general height adjustment above the ground level 115 of the conveyor sections 16 which are engaged by the rail engaging suspender assemblies 92 is achieved by adjustment of the trolley hydraulic rams 9, which carry lift frames 11, and that the varying clearance of the individual assemblies is otherwise adjusted, as will be explained. Note is taken that the rail 39 is in this view of FIG. 4, curved at sleepers 36a, straight at sleepers 36b, and curved again at sleepers 36c.

As further illustrated in FIGS. 1 and 5-9, the shiftable conveyor 15 includes module sleepers 36, 36a, 36b, and 36c, (generally called 36) situated in spaced relationship in each of the conveyor sections 16 along the entire length of the shiftable conveyor 15. Stringer supports 17 are secured to the module sleepers 36 by means of support mount plates 18, with appropriate fasteners. Stringer support braces 34 and module braces 35 serve to maintain the stringer supports 17 in substantially vertical alignment on module sleepers 36, and idler stringers 21 are mounted in angular relationship on the stringer supports 17, and connect the stringer supports 17 to each other in each one of the conveyor sections 16. Referring specifically to FIGS. 5-7, conveyor carrying idlers 19 are provided in spaced, rotatable relationship in each of the conveyor sections 16, and are each attached to the respective idler stringers 21 by means of an end connection 22, secured to an idler shaft 28, on each of the conveyor carrying idlers 19 by means of an end connection bolt 29, as illustrated in FIGS. 6 and 7. The end connections 22 are also connected to a pivot plate 23, which is in turn secured to the idler stringer 21 by means of a pivot pin 25. A pivot plate slot 24, and a pivot stop 26, serve to facilitate adjustment of the conveyor carrying idlers 19 with respect to the stringer support 17. As illustrated in FIGS. 5, 8 and 9, multiple belt return idlers 20 are provided beneath the conveyor carrying idlers 19 in shiftable conveyor 15, and are each provided with an idler shaft 28 and end connections 22, for attachment to the stringer supports 17 by means of a chain 29a, and a cooperating link slot 33, with a clamp 33a and a lift rod 33b. It will be appreciated by those skilled in the art that the attachment of the conveyor carrying idlers 19 and the belt return idlers 20 can be made in a variety of ways, it being necessary only to provide a means for flexible support of the conveyor belt 40 in each of the conveyor sections 16 of the shiftable conveyor 15. Since the entire length of the shiftable conveyor 15 between the head station 41 and the tail station 42 is shaped by discrete, individual conveyor sections 16, which are connected only by the rails 39 and the conveyor belt 40, substantial flexibility is built into the conveyor line to facilitate successive shifting of the conveyor sections 16.

Figure 13:
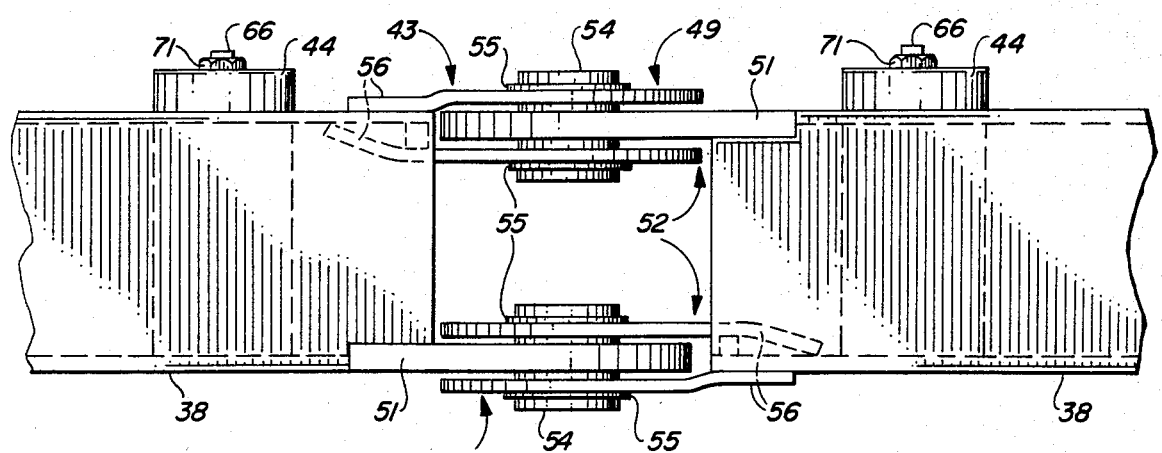
FIG. 13 is a side elevation of the shifting beam connector illustrated in FIG. 12.

Referring now to FIGS. 2 and 13 of the drawings showing a further preferred embodiment of another aspect of the invention, each shifting hinge 43 in the shifting beam strings 31 includes an outside connector plate 49 and a cooperating inside connector plate 52 at the top, and a second outside connector plate 49 and companion inside connector plate 52 at the bottom, for each shifting hinge 43 which connects the shifting beams 38. Accordingly, two pairs of the outside connector plates 49 and inside connector plates 52, respectively, are provided as components of each shifting hinge 43. As illustrated in FIG. 13, the plate legs 56 of one pair of the outside connector plates 49 and inside connector plates 52 are attached to a common end of one of the shifting beams 38, while the plate legs 56 of the opposite and cooperating pair of the outside connector plates 49 and inside connector plates 52 are secured to the adjacent one of the shifting beams 38. A shifting beam plate 51 is welded or otherwise attached to each of the adjacent shifting beams 38, and is pivotally secured between each pair of the outside connector plates 49 and the inside connector plates 52, respectively, by means of a connector pin 54. This mechanical arrangement permits each of the adjacent shifting beams 38 in the shifting beam strings 31 to articulate on the connector pins 54, as hereinafter described. In a most preferred embodiment of this aspect of the invention a shifting beam ram 57 joins the top ones of outside connector plates 49 and inside connector plates 52 in each plate combination, and includes a cylinder 58 and a cooperating clevis 59, which is secured by a connecting pin 63 to the outside connector plate ear 50, of the inside connector plate 49. A cooperating ram rod 60 is secured to the inside connector plate ear 53 of the inside connector plate 52 at one end, by means of another connecting pin 63. The ram rod 60 extends into the cylinder 58 and is attached to the piston 61. Accordingly, the relative pivot of each shifting beam 38 with respect to the adjacent shifting beam 38 in the shifting beam strings 31 is limited and controlled by the stroke of the shifting beam rams 57.

Figures 10, 11:
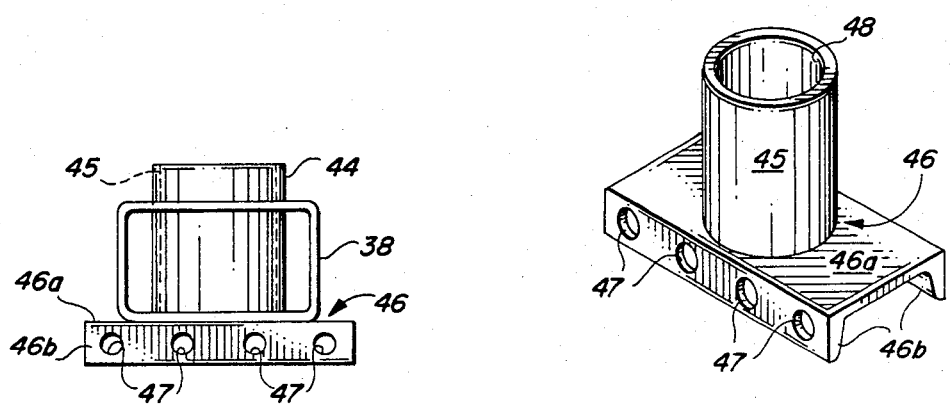
FIG. 10 is an end elevation of a preferred configuration for the spindle base plate and spindle housing components of the shifting beams.
FIG. 11 is a perspective view of a preferred spindle base plate and spindle.
Figure 12:
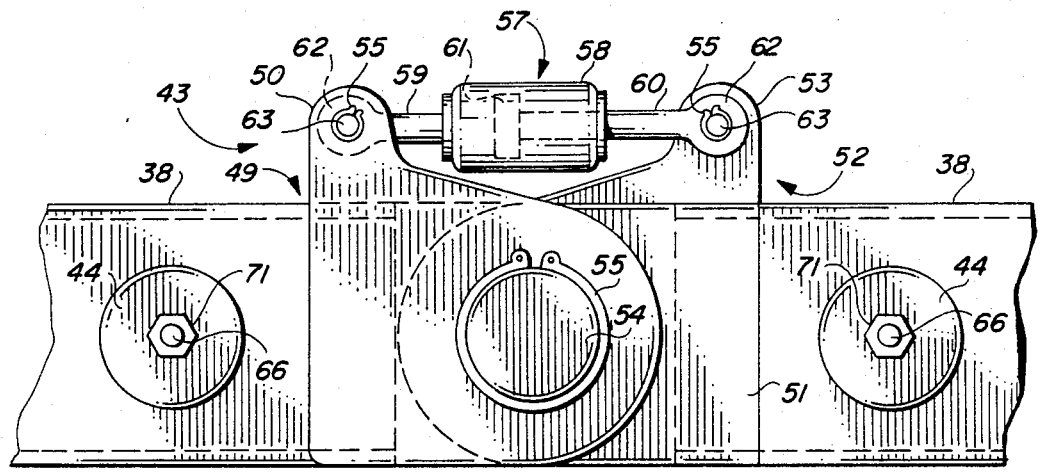
FIG. 12 is a plan view of a preferred shifting beam articulation connection used to facilitate articulated movement of the shifting beams in the shifting beam strings.

Referring further to FIGS. 10-12, in further disclosure of a preferred embodiment of another aspect of the invention, generally cylindrically-shaped, hollow spindle housings 44 are mounted in spaced relationship in the shifting beams 38, with the top end of each of the spindle housings 44 extending from attachment to the shifting beams 38. Referring specifically to FIG. 11, a spindle base plate 46 is provided with a base plate top 46a, and a pair of base plate flanges 46b extending downwardly from the base plate top 46a. A cylindrical spindle 45 extends from attachment to the base plate top 46a, and is provided with a spindle bore 48. A spindle 45 is designed to register with and project adjustably upward through each of the hollow spindle housings 44, as illustrated in FIG. 10. Base plate flanges 46b of each spindle base plate 46, are also provided with base pin holes 47, as illustrated.

Figure 14:
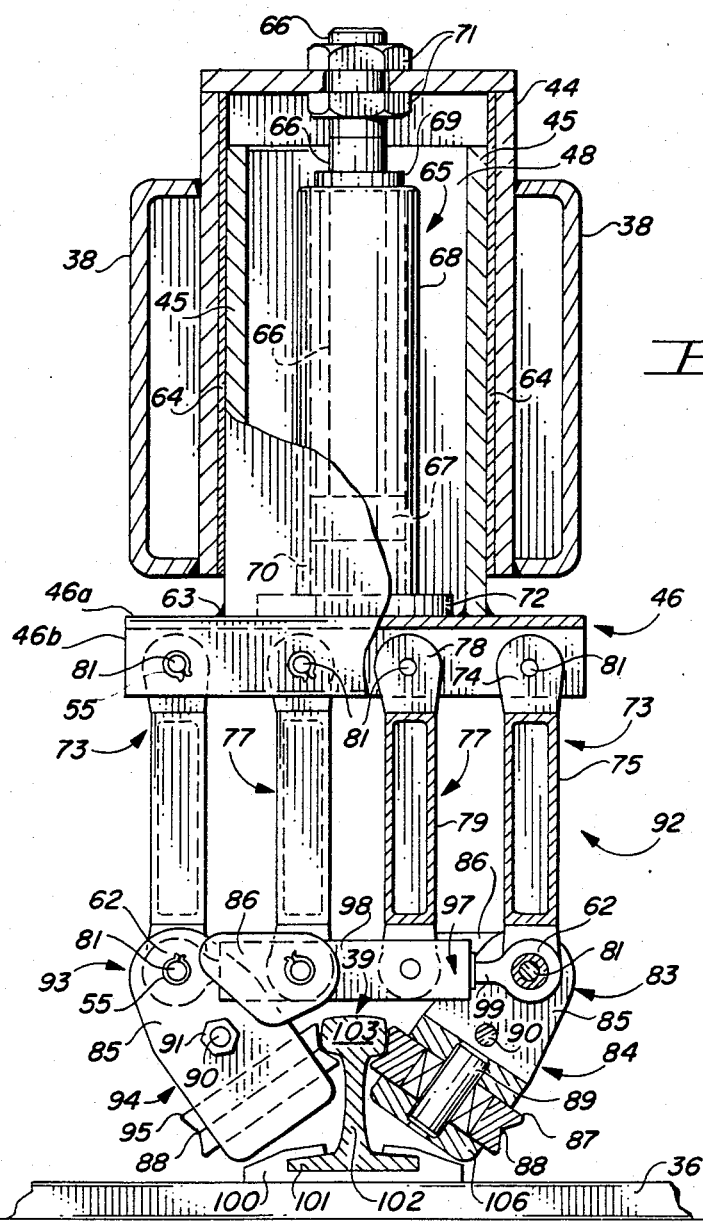
FIG. 14 is a lateral section of the articulated beam of FIG. 12 of the conveyor shifting apparatus, with spindle and roller pairs assembled therewith.
Figure 15:
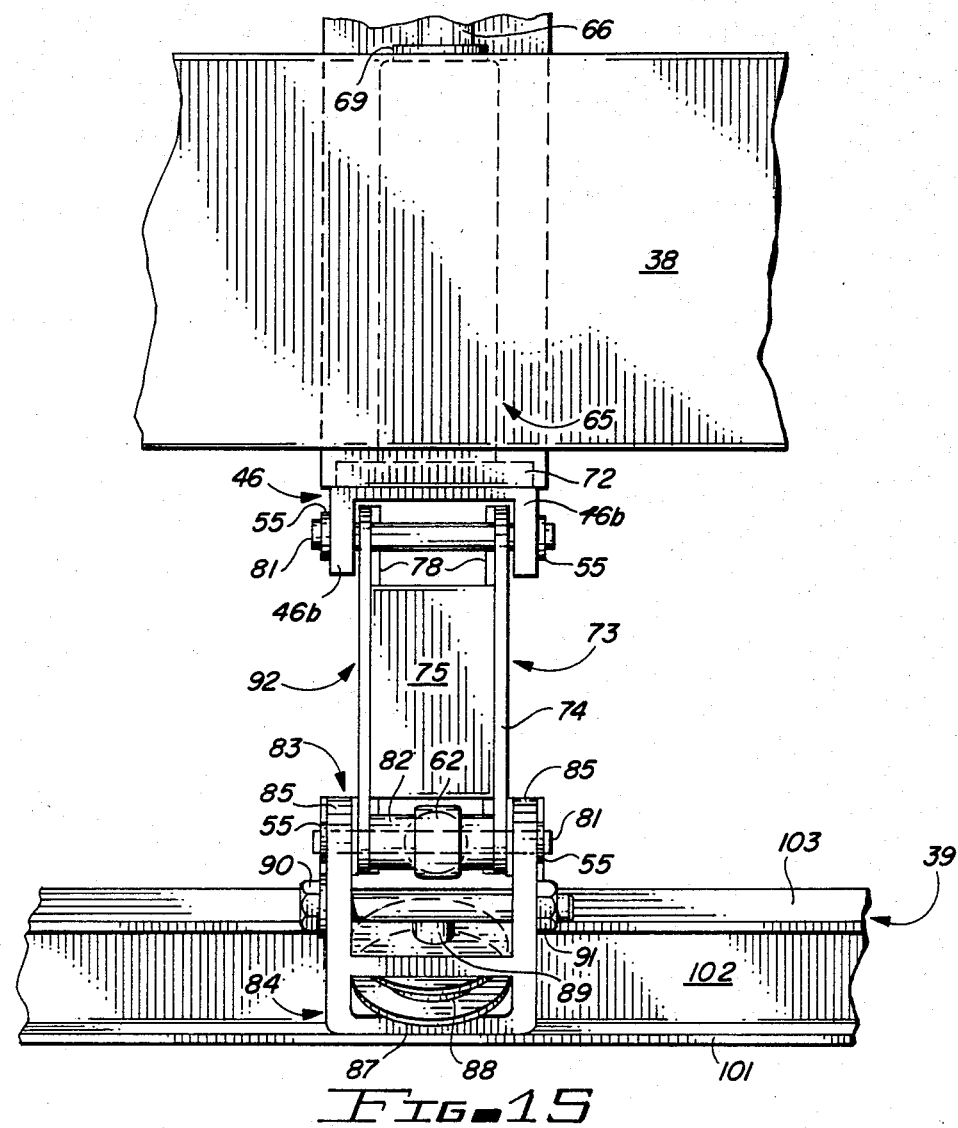
FIG. 15 is a side elevation of the conveyor shifting apparatus illustrated in FIG. 14.
Figure 16:
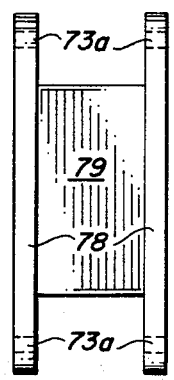
FIG. 16 is a side elevation of a preferred heavy link component of the rail engaging assembly illustrated in the conveyor shifting apparatus in FIGS. 14 and 15.
Figure 17:
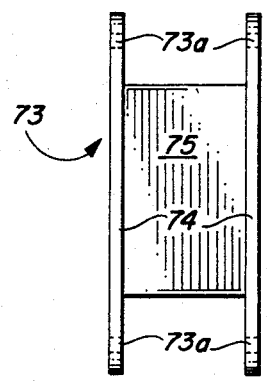
FIG. 17 is a side elevation of a preferred light link component of the rail engaging assembly illustrated in the conveyor shifting apparatus in FIGS. 14 and 15.

Referring now to FIGS. 14–17 of the drawings each of the rail-engaging suspender assemblies 92 of the conveyor rail engaging array 30 is mounted to a spindle base plate 46 by means of a pair of light links 73 and two heavy links 77, which are more particularly illustrated in FIGS. 16 and 17. Each light link 73 is shaped by light link flanges 74 spanning a light link body 75, while each heavy link 77 is characterized by somewhat thicker heavy link flanges 78 and a thinner heavy link body 79. As illustrated in FIGS. 14 and 15, one end of the light links 73 and the heavy links 77 are pivotally attached to the base plate flanges 46b of the spindle base plate 46 by means of link pins 81, which register with pin holes 73a in the light links 73 and the heavy links 77, and with the base pin holes 47 in the base plate flanges 46b. Snap rings 55 serve to register with grooves provided in the link pins 81 in order to pivotally secure the light links 73 and the heavy links 77 to the base plate flanges 46b. The opposite ends of the light links 73 are attached to the light link brackets 85, which extend from an outside roller housing 84 and an opposing inside roller housing 94, respectively, as illustrated. Furthermore, the opposite ends of the heavy links 77 are attached to heavy link brackets 86, also attached to the light link brackets 85 of the outside roller housing 84 and inside roller housing 94, respectively. A spreader ram 97 is disposed between the outside roller assembly 83, which contains the outside roller housing 84, and the inside roller assembly 93, which includes the inside roller housing 94, as illustrated in FIG. 14. In a preferred embodiment of this aspect of the invention the spreader ram cylinder 98 is attached through a mounting eye 62 to the light link bracket 85 of the inside roller housing 94, by means of a link pin 81, which extends through registering pin holes 73a in the light link bracket 85 and the mounting eye 62. Snap rings 55 serve to maintain the link pin 81 in position and to allow pivotal movement of the light link 73 and the mounting eye 62 of the spreader ram cylinder 98 with respect to the light link bracket 85. The spreader ram piston 99 is provided with a second mounting eye 62, which is connected to the opposite light link bracket 85 positioned on the outside roller housing 84 by means of a second link pin 81, which link pin 81 also attaches the second connecting light link 73 to the light link bracket 85. In a most preferred embodiment, and referring again to FIG. 15, a link pin bushing 82 is provided on each of the link pins 81 which secure the mounting eyes 62 located on the spreader ram cylinder 98 and the spreader ram piston 99, to the light link brackets 85, respectively, in order to facilitate positive operation of the spreader ram 97, as hereinafter described.

Figure 18:
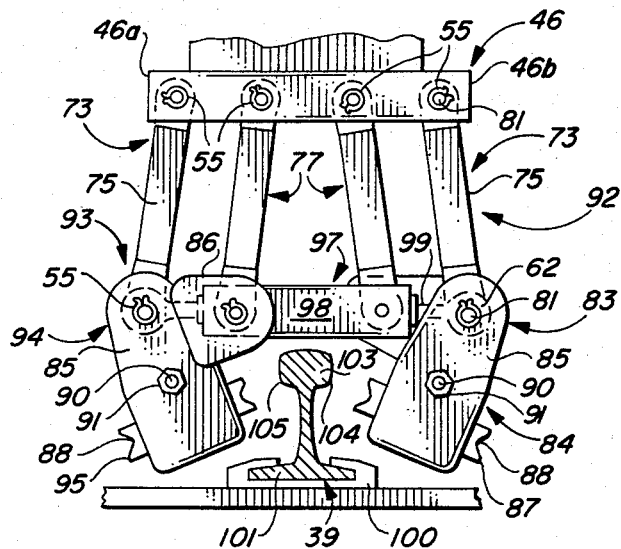
FIG. 18 is an end elevation of the rail engaging assembly in open configuration with respect to one of the rails in the shiftable conveyor.

As heretofore noted, one end of one of the heavy links 77 is attached to a heavy link bracket 86, fastened to the inside roller housing 94, while the end of the second heavy link 77 is secured a second heavy link bracket 86, attached to the outside roller housing 84. Accordingly, referring now to FIG. 18, when the spreader ram 97 is activated by appropriate controls (not illustrated) to extend the spreader ram piston 99 from the spreader ram cylinder 98, the outside roller housing 84 is moved away from the inside roller housing 94, in order to facilitate removal of each of the rail-engaging suspender assemblies 92 from the rails 39. Conversely, retraction of the spreader ram piston 99 into the spreader ram cylinder 98 causes the outside roller housing 84 and the inside roller housing 94 to converge, and the outside roller 87 and inside roller 95 to engage the outside rail shoulder 104 and inside rail shoulder 105, respectively, as illustrated in FIGS. 14 and 18.

Referring now to FIGS. 14, 15, and 18–21, in a most preferred embodiment of another aspect of the invention both the outside roller 87 and the inside roller 95 in the outside roller housing 84 and inside roller housing 94, respectively, are provided with a roller groove 88, which matches the outside rail shoulder 104 and the inside rail shoulder 105 of the rail 39, in order to facilitate smooth roller traversal of the rail head 103 as the straddle crane traverses the shiftable conveyor 15.

Figure 19:
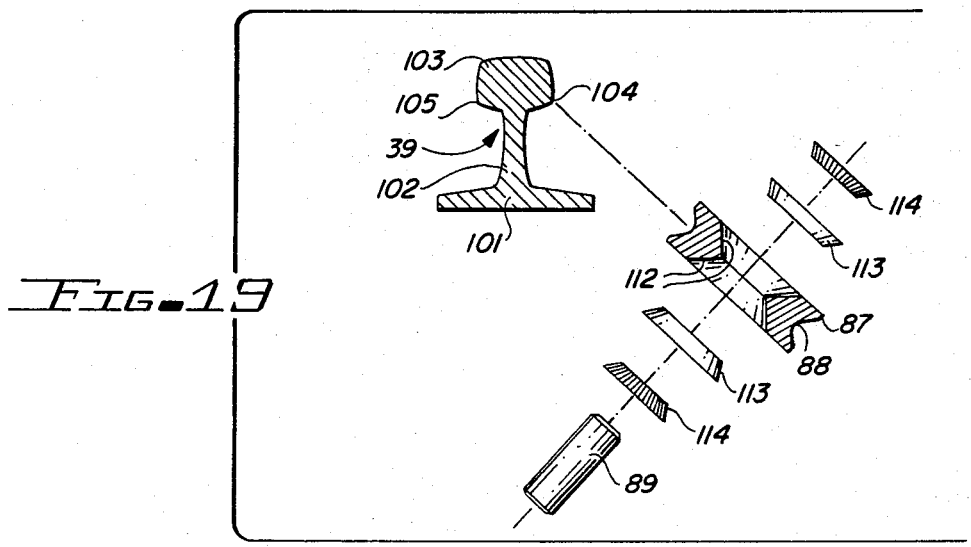
FIG. 19 is an exploded sectional view of a rail of the shiftable conveyor and the rollers to be brought to engagement with the rail.
Figure 20:
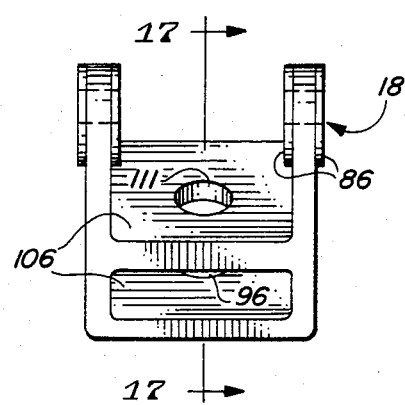
FIG. 20 is a front elevation of a preferred roller housing component of the rail engaging assembly.
Figure 21:
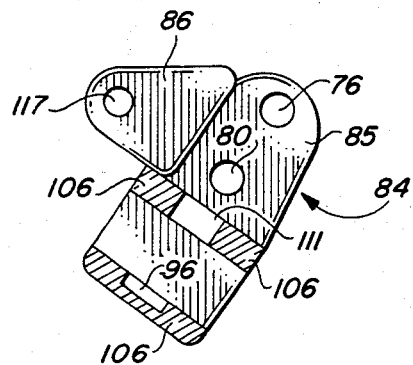
FIG. 21 is a sectional view, taken along lines 17—17 in FIG. 20, of the roller housing illustrated in FIG. 20.

Referring again to FIGS. 15, 18, 19, 20, and 21, in yet another most preferred embodiment of a further aspect of the invention the light link brackets 85 in the outside roller housing 84 and inside roller housing 94 are each characterized by a link pin aperture 76 and a spacer bolt aperture 80, spaced from the link pin aperture 76. Furthermore, the heavy link bracket housing 86 is welded or otherwise fixedly secured to the light link bracket 85 and is provided with a heavy link bracket aperture 117. Each light link bracket 85 is shaped to define a shaft mount plate 106, which is provided with an interior space to accommodate a wheel axle 89, journalled for rotation in the roller shaft aperture 111 and roller shaft seat 96. As illustrated in FIG. 19, a wheel axle 89 secures the outside roller 87 in the shaft mount plate 106, and in a most preferred embodiment, both the outside roller 87 and the inside roller 95 are provided with tapered bearing seats 112, and cooperating bearing races 113 to accommodate bearings 114, in order to facilitate a smooth rotation of the outside roller 86 and inside roller 95 on the respective wheel axles 89. A spacer bolt 90 in inserted in the spacer bolt apertures 80, provided in the light link brackets 85, and is secured by the spacer bolt nut 91, as illustrated in FIG. 15, in order to secure the wheel axles 89 in the roller shaft aperture 111 and roller shaft seat 96, of the outside roller housing 84 and the inside roller housing 94, respectively.

Referring again to FIGS. 14 and 15 of the drawings in a further preferred embodiment of the invention each spindle 45, attached to a spindle base plate 46 by means of welds 63a, is inserted concentrically inside a spindle housing 44, which is welded to the shifting beams 38. Furthermore, an adjustable double-acting suspender ram 65, having a suspender cylinder 68, is attached by means of a ram base 72, to the base plate top 46a of each spindle base plate 46, and extends into each spindle 45. Each suspender cylinder 68 is further provided with a suspender bore 70, with one end of a suspender rod 66 extending through the top of the spindle housing 44, and a suspender rod stop 67 at the opposite end of the suspender rod 66. A gland 69 is provided at the top of the suspender cylinder 68, and the projecting and threaded end of the suspender rod 66 is secured to the top of the spindle housing 44 by means of suspender mount nuts 71. Accordingly, each rail engaging suspender assembly 92 in the shifting beams 38 is carried adjustably by a spindle base plate 46, which is suspended from a spindle housing 44 and the shifting beams 38, and each spindle 45 is permitted and caused to move up and down inside the cooperating spindle housing 44 by the action of a suspender ram 65, in order to adjustably define the curvature of the rails 39 and the clearance of the module sleepers 36 as mentioned hereinbefore, as the rail engaging suspender assemblies 92 traverse the rails 39. In a still further preferred embodiment of this aspect of the invention, a spindle bushing 64 is provided between the inside surface of the spindle housing 44 and the outside surface of the spindle 45, in order to produce a closer tolerance and minimize lateral movement while allowing pivoting of the suspended rail engaging suspender assemblies 92 and the spindle base plate 46 with respect to the shifting beams 38.

Referring now to FIGS. 22 and 23, an alternative design of the rail 39 is shown in isolated section in FIG. 23 having a threaded pin 108 welded thereto, with a cooperating lock nut 108b, having locking means known in the art. FIG. 22 shows a section of a hollow module sleeper 119 with a slotted hole 108a, receiving the threaded pin 108 locked by a nut 108b with some degree of freedom, to wit, in pivoting about the pin 108 and also lengthwise of the rail 39 in the oversize design of the slotted hole 108a.

FIG. 24 schematically shows the deflected shape 110 of the shiftable conveyor 15 components which are supported below the rail-engaging array 30. Only 4 sets of the outside rollers 87 and inside rollers 95 are shown, being those which might have a substantial lateral action in bringing about such a shape, as hereinafter explained. The other outside rollers 87 and inside rollers 95, respectively, are deployed primarily to give vertical support to the shiftable conveyor 15, and define the desired vertical curvature. The shape is the shape of a Vierendeel Frame with relative end translation movements enforced.

Now that the first preferred major embodiment of the invention has been described, another sometimes preferred embodiment will be shown, illustrating a differing novel shiftable conveyor and suitable novel shifting array.

Referring now to FIG. 25, which is a schematic plan, a second major shape of a conveyor frame 107 of the invention is illustrated, and includes conveyor support sections 118, sleepers 119 and rails 120, which are similar to the conveyor sections 16, module sleepers 36, and rails 39, respectively, of the previous embodiment as illustrated in FIG. 1, respectively, with joints 121 and novel telescoping joints 122 and 123 having a releasable telescoping degree of freedom. The telescoping of joints 122 and 123 allows the conveyor as a whole to take on the smoother s-shape illustrated by the whole of the FIG. 25, since the conveyor support sections 118 are not so constrained, compared to the conveyor section 16 of the previous embodiments, to move mainly in translation, but can also rotate to a degree, allowing a much larger and safer shifting step.

FIGS. 26 and 27 represent larger and more detailed plans of the conveyor frame 107, supporting a conveyor belt 124, comprising a segment of the length of the conveyor 125, which also has a head station 41 and a tail station 42, as illustrated in FIG. 2. Moreover, the shifter 126, comprising a novel steerable straddle frame 127 with a novel shifting array 128 is shown. This is all further shown in elevation section 27.

Further referring to FIGS. 26 and 27, the straddle crane 127 supports powered trolleys 130 running on beams 131 supported on columns 132, with kingpins 133 steerably housed therein, the king pins 133 mounted on tracks 134, all by means well known in the art, including tie-beams 135. The powered trolleys 130 support double-acting hoist rams 136 from swivels 137, by means well known in the art.

Hoist rams 136 have rods 138 with swivel supports 139 adjustably supporting the shifting array 128 in service position, all by means well known in the art.

The shifting array 128 comprises a pair of large beams 140, torquing roller arrays 141, and lifting suspender drum apparatus 142, with both the torquing roller arrays 141 and the lifting suspender apparatus 142 engaging the rail 120.

As illustrated in FIGS. 26 and 28 each of the eight lifting suspender drum apparatus 142 comprises a drum 143 rotatably mounted in the large beam 140 and pivoted and powered by a ring gear and motor assembly 144, and bearing means 144a, elements which are well known in the art. The drum 143 has a spindle housing sleeve 145 mounted eccentrically in the drum 143, to selectively carry the spindle housing sleeve 145 to the center or off center of the large beam 140 by operation of the ring gear and motor assembly 144. FIG. 26 illustrates the spindle housing sleeve means 145 off-center to accommodate and define the s-shaped curve in the rails 120. Suspender 146 is an elongated version of the rail engaging suspender assembly 92 illustrated in FIGS. 14, 15 and 18. The greater length of the suspender 146 is facilitated because of the lack of lateral sway of the suspender 146 as compared to that of the rail engaging suspender assembly 92.

Referring again to FIGS. 26 and 27 and additionally to FIG. 29, each torquing roller array 141 comprises a cylindrically-shaped rotating housing 147 powered in rotation about a vertical axis by a torque, motor, and bearing 148 mounted in the large beam 140. Each rotating housing 147 houses a pair of roller pins 149 mounted in cylindrical bearings 150, the roller pins 149 having limited clearance to ride up and down in the cylindrical bearings 150. The rollers 151 are mounted to the roller pins 149 by means of bearings 152 and are vertically positioned to clear the rail 120 by hydraulic rams 153 attached thereover; in the alternative, the roller pins 149 may be left free-running by leaving the rotating housing 147 ported. In FIG. 26 the torque motor and bearings 148 are shown to be acting to torque the rotating housings 147 in the counter-clockwise direction and the center rotating housings 147 in the clockwise direction, thereby imparting the traveling s-shaped curve to the rails 120 through the rolling contact of rollers 151 on the rail heads 103 of the rails 120. The torque of each central torquing roller array 141 is twice that of each end torquing roller array 141, thereby imparting equal curvature to four intervals of the rails 120 defined by the six torquing roller arrays 141. At the same time, lifting suspender drum apparatus 142 hoists the rails 120 into a smooth even curve. Referring now to FIGS. 30 through 33, which illustrate a preferred embodiment of a telescoping joint 123 having an automatically releasible degree of freedom, rail segments 120a and 120b of rails 120 have feathered ends 154 mating with space therebetween for a corrugated frame 155. Feathered ends 154 comprise slanted web slice plates 156 welded between feathered rail bulbs 120a and 120b and feathered flanges 157 and extending into cut-outs 158 in webs 159. Web splice plates 156 have slotted holes 160, carrying headed keepers 161 insuring against excessive separation of the feathered ends 154. The feathered ends 154 have considerable bending strength imparted by the channel sleeve 162 comprising a rail segment 163 and slotted fittings 164 welded thereto. Slotted fittings 164 are provided with snap lugs 165 in slots 166, adapted to snap into snap-recesses 167 in the feathered flanges 157.

The foregoing two major embodiments and the operation thereof will now be further described.

In operation, and referring again to FIGS. 1-22 of the drawings, when it is desired to utilize the conveyor shifting apparatus 1 of this invention, the rail engaging array 30 is initially suspended from the straddle crane 2 which is placed astraddle the shiftable conveyor 15, optionally by lifting the whole over, or driving over the tail station 42 or otherwise. The lift frames 11 which are attached to selected ones of the shifting beams 38 in the shifting beams 31 are attached to the trolley hydraulic rams 9, as illustrated in FIG. 1, and each of the spreader rams 97 are initially activated by operation of appropriate controls known to those skilled in the art, to extend the respective spreader ram pistons 99 and open the outside roller housing 84 and inside roller housing 94, as illustrated in FIG. 18. This open configuration of the rail engaging suspender assemblies 92 is achieved as the opening operation of the spreader ram 96 exerts lateral pressure on the link pins 81 joining the mounting eyes 62 of the spreader ram piston 99 and the spreader ram cylinder 98, to spread the outside roller assembly 83 and the inside roller assembly 93. Each of the shifting beam strings 31 are then raised by operation of the trolley hydraulic rams 9 to a position over the respective rails 39, and the shifting beam strings 31 are are then slowly lowered and adjusted by the trolley hydraulic rams 9 until the respective ones of the outside roller housings 84 and inside roller housings 94 are adjacent to the rail head 103 of each rail 39. When each rail engaging suspender assembly 92 is fairly near the proper position the suspender rams 65 and shifting beam rams 57 are actuated to bring the apparatus in proper relationship to the rails 39 as illustrated in FIG. 18, and the spreader rams 97 are again activated by appropriate controls to close the outside roller housings 84 and inside roller housings 94 and secure the outside rollers 87 and the inside rollers 95 against the outside rail shoulder 104 and inside rail shoulder 105, respectively, of the rails 39, as illustrated in FIG. 14.

When each of the rail engaging suspender assemblies 92 are in functional position as illustrated in FIG. 14, the trolley hydraulic rams 9 and suspender rams 65 are again activated in the required way to lift the shifting beams 38 and the attached rail engaging suspender assemblies 92 and raise the conveyor sections 16 adjacent the shifting beam strings 31 and the module sleepers 36 beneath the shifting beams 38, off the ground to a desired varying degree shown and mentioned in association with FIG. 2, to define the vertical curvature of the rails 39. This occurs as an upward force is applied by the trolley hydraulic rams 9 to the shifting beams 38 attached to the lift frames 11, and the shifting beams 38 move upwardly, along the suspender rods 66 in the suspender rams 65. Each suspender ram 65 provides local adjustment to the outside roller assembly 83.

The above described initial lifting sequence is executed with the conveyor initially in operation disposition where the rails 39 are substantially straight. Also, the conveyor shifting apparatus 1 will be initially located immediately adjacent to the head station, 41 (or, if desired, the tail station 42). Therefore, the first adjusted supported position of the rails 39 will be curved vertically, but straight in plan. Then, by employment of means well known in the art, the head station 41 will be lifted and shifted slowly through the desired shifting step. Simultaneously, the rail engaging array 30 is brought into congruent offset curvature by simultaneous operation of the trolley winch drives 13 and the shifting beam rams 57, resulting in lateral s-shaped curvature, as well as the vertical curvature. The shifting step and the s-curvature are planned so as to define the curvature of the rails 39 within safe limits. The maximum vertical curvature is designed to be some distance from the maximum horizontal curvature, thereby providing a diminished total.

The straddle crane 2 is then moved forward away from the head station 41 in the direction of the arrow as illustrated in FIGS. 2 and 3, and the lifting and lateral pressure exerted by the rail engaging suspender assemblies 92 on the rails 39 causes those conveyor sections 16 which are spanned by the shifting beam strings 31, to move laterally from a first linear position to a second linear position which is displaced from the first position. As the straddle crane 2 continues its forward progress, the shifting action continues as the outside rollers 87 and the inside rollers 95, mounted in the outside roller housing 84 and the inside roller housing 94, respectively, of the rail engaging suspender assemblies 92, traverse the rail heads 103. Accordingly, the conveyor shifting apparatus 1 can be used to shift the entire length of the shiftable conveyor 15 from the first position to a displaced second configuration, as illustrated in FIG. 2, with the final step of shifting the tail station 42 accomplished, just as the head station 41 was shifted, with a simultaneous operation of the rail engaging array 30 to maintain congruence.

A great advantage of the rail engaging array 30 with its great range of articulation is that the apparatus can approximate and accommodate a wide variety of a s-shaped curves, including the rippled curve of the chords of the Vierendeel frame. The local irregularities of the deflected Vierendeel frame are accomodated by the partial latent freedom of the rail engaging suspender assemblies 92.

Referring again to FIG. 2, it will be appreciated by those skilled in the art that a conventional tractor 116, or equivalent machinery must be used to move the head station 41 and similarly the tail station 42, of the shiftable conveyor 15, according to the knowledge of those skilled in the art. However, it will be further appreciated that the conveyor shifting apparatus 1 of this invention can be used to relocate, and more particularly, to laterally relocate a shiftable conveyor such as the shiftable conveyor 15 of substantially any length or any type, to any desired new position which is eigher parallel to or at a selected angle with respect to the original conveyor line. This option can be realized by guiding the straddle crane 2 or an equivalent conveyor shifting apparatus suspension system to whatever degree is necessary in order to achieve a specified and desired second conveyor location.

Now considering the second major embodiment of FIGS. 22-33 the operation of the shifter 126 proceeds similarly to that of the conveyor shifting apparatus 1. The conveyor 125 is initially straight and empty. The straddle crane 127 carries the large beams 140 as far outboard and apart as possible, and if possible, drives over the tail station 42 of the conveyor 125. Otherwise, the straddle crane 127 is hoisted, by crane located at the mine, over the conveyor 125. The lifting suspender drum apparatus 142 is revolved to bring the suspenders 146 to the central axis of the large beams 140. The rotating housings 147 are then rotated so as to maximize the clearance between the pairs of rollers 151. The powered trolleys 130 and hoist rams 136 are powered to carry large beams 140 into alignment with and well over the rails 120. Hoist rams 136 then operate to lower the large beams 140 sufficiently for engagement of the suspenders 146. Suspenders 146 are engaged after the fashion of the rail engaging suspender assemblies 92, already described, thereby gripping the rails 120. The hoist rams 136 then lift the large beams 140 sufficiently to lift the conveyor 125 by the suspenders 146 barely clear of the ground. Means of the art are then activated to begin shifting of the tail station 42. Hydraulic rams 153 operate to position the rollers 151 at the level of the rail bulbs 120a and 120b of the rail 120. The torque motor and bearing 148 torques the rotating housings 147 to bring the rollers 151 into engagement with the rails 120, which forces the rails 120 into flexure. Axial forces are induced in the rails 120 which causes the snap lugs 165 to snap out of the snap recesses 167, thereby compressing the corrugated springs 155, and allowing release and diminution of the axial forces, and facilitating the s-shaped curvature illustrated in FIG. 25.

When the tail station 42 and s-shaped curve approximate the desire safe shifting step, the straddle crane 127, which is powered by means well-known in the art, drives the shifting array 128 along the conveyor 125. Conveyor support sections 118 successively pass through the straddle crane 127, and be shifted. Telescopic joints 122 and 123 enter the torquing roller arrays 141 in sequence, and the major circumference of the rollers 151 bear on the web splice plates 156, thereby compressing each corrugated spring 155 and releasing the telescoping joints 122 or 123 to allow curvature simultaneously with the need for such curvature, all of which occurs within the span of the pairs of rollers 151 of the torquing roller array 141. The exit procedure and shifting of the head station 41 is similar to and deducible from the reverse of the aforementioned steps. A reversal of the above procedure from the head station 41 to the tail station 42 might be undertaken to take another shifting step, optionally.

The releasibility of the telescoping joints 122 and 123 is preferred, but not imperative. This function offers the advantage of additional stiffness when shifting is not transpiring, and sufficient flexibility when it is. Other embodiments of releasable telescoping might serve, such as a non-automatic release, in non-exclusive particular. Likewise, other configurations of roller arrays would serve; for example, positioning the hydraulic rams 153, while convenient, might be omitted, provided roller pins 149 are secured by means in the housings. Other lifting roller arrays serving the ends of the suspenders 147 might serve to impart vertical lift and curvature, according to methods well-known in the art. Likewise, one or two large beams such as the large beams 140 might be carried by one or more side-boom tractors and achieve an acceptable shifting result without the use of a straddle crane 127. It is also possible for three unconnected side-boom tractors to carry three distinct torquing roller arrays such as the torquing roller arrays 141, but mounted on special sidebooms instead of the large beams 140, to accomplish the distributed curvature disclosed. Even so, these variations are all envisioned within the scope of the invention.

The operation and advantage of the equal constant curvature combined with the smooth vertical rail deflection is now evidently obtained, especially since the sum of stresses in the rails 120 is controlled to a tolerable limit. The advantage of the degrees of freedom in the rails 120 is now evident in the greater safe shifting step.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A method for shifting a shiftable conveyor provided with rails from a first position to a second position comprising:
    (a) suspending a plurality of articulated shifting beams and track engaging means carried by said shifting beams over at least one of the rails;
    (b) engaging sid track engaging means with at least one of the rails; and
    (c) causing the shifting beams to traverse the conveyor urging said shifting beams in a curvature from said first position into said second position.

2. The method as recited in claim 1 further comprising raising said shifting beam means and said track engaging means to a selected height.

3. A method for shifting a shiftable conveyor provided with rails mounted on rail sleepers from a first linear alignment to a second linear alignment, comprising:
    (a) positioning a first set of shifting beams connected in end-to-end, articulated relationship and carrying a first plurality of rail engaging means, on one side of the conveyor over a first one of the rails;
    (b) positioning a second set of shifting beams connected in end-to-end, articulated relationship and carrying a second plurality of rail engaging means, on the opposite side of the conveyor over the second one of the rails;
    (c) attaching said first plurality of rail engaging means to the first one of the rails, and said second plurality of rail-engaging means to the second one of the rails;
    (d) raising said first and second set of shifting beams and said first and second plurality of rail-engaging means to a selected height whereby the rails and rail sleepers beneath said first and second set of shifting beams are lifted from the ground; and
    (e) urging said first and second set of shifting beams and said first and second plurality of rail-engaging means along the rails in a path conforming to said second linear alignment.

4. A method for shifting a shiftable conveyor provided with parallel rails mounted on rail sleepers from a first linear configuration to a second linear configuration which is substantially parallel to the first linear configuration, comprising:
    (a) positioning a first set of articulated shifting beams on one side of the conveyor over a first one of the rails;
    (b) positioning a second set of articulated shifting beams on the opposite side of the conveyor over the second one of the rails;
    (c) securing at least one first rail engaging means to said first shifting beams and to the first one of the rails, and securing at least one second rail engaging means to said second shifting beams and to the second one of the rails;
    (d) raising said first and second shifting beams and said first and second rail engaging means to a selected height; and (e) urging said first and second shifting beams and said first and second rail engaging means along the conveyor in a path conforming to said second linear configuration.

5. The method as recited in claim 4 comprising the additional step of raising said first and second shifting beam means and said first and second rail engaging means to a height sufficient to lift the rail sleepers located beneath said first and second shifting beam means from the ground.

6. A method for adjusting a shiftable conveyor mounted on spaced rails and rail sleepers from a first position to a second position substantially parallel to the first position, comprising:

(a) suspending a first plurality of shifting beams joined in end-to-end, articulated relationship over one of the rails, said first plurality of shifting beams each carrying at least one first track engaging means;

(b) suspending a second plurality of shifting beams joined in end-to-end, articulated relationship over the second one of the rails, said second plurality of shifting beams each carrying at least one second track engaging means;

(c) attaching said first track engaging means to the first one of the rails, and attaching said second track engaging means to the second one of the rails; and (d) urging said first and second plurality of shifting beams and said first and second track engaging means along the conveyor into said second position.

7. The method as recited in claim 6 comprising the additional step of raising said first and second plurality of shifting beams and said first and second rail engaging means to a selected height.

* * * * *